(12) United States Patent
Qiu et al.

(10) Patent No.: US 9,148,996 B2
(45) Date of Patent: Oct. 6, 2015

(54) LAWN ORNAMENT HAVING ROTATABLE DECORATIVE BLADES WITH SOLAR-ACTIVATED LIGHT-EMITTING DEVICES

(71) Applicant: Plow & Hearth LLC, Madison, VA (US)

(72) Inventors: Fei Qiu, Richmond, VA (US); Chengyong Tu, Ningbo (CN); Richard Koval, Earlysville, VA (US)

(73) Assignee: Plow & Hearth, LLC, Madison, VA (US)

( * ) Notice: Subject to any disclaimer, the term of this patent is extended or adjusted under 35 U.S.C. 154(b) by 0 days.

(21) Appl. No.: 14/231,473

(22) Filed: Mar. 31, 2014

(65) Prior Publication Data

US 2015/0092399 A1    Apr. 2, 2015

(51) Int. Cl.
| | |
|---|---|
| *F21L 4/00* | (2006.01) |
| *A01D 34/00* | (2006.01) |
| *A63H 1/24* | (2006.01) |
| *F21S 9/03* | (2006.01) |
| *F21V 21/08* | (2006.01) |
| *F21W 121/00* | (2006.01) |
| *F21Y 101/02* | (2006.01) |

(52) U.S. Cl.
CPC ............... *A01D 34/001* (2013.01); *A63H 1/24* (2013.01); *F21S 9/03* (2013.01); *F21V 21/0824* (2013.01); *F21W 2121/00* (2013.01); *F21Y 2101/02* (2013.01)

(58) Field of Classification Search
CPC ..................................... F21L 4/00; F21L 4/08
USPC .......................................................... 362/183
See application file for complete search history.

(56) References Cited

U.S. PATENT DOCUMENTS

| | | | |
|---|---|---|---|
| 6,530,816 B1 | 3/2003 | Chiu | |
| 6,575,585 B2 * | 6/2003 | Nelson et al. | 362/35 |
| 6,789,911 B2 | 9/2004 | Nelson et al. | |
| 7,259,536 B1 | 8/2007 | Ketner | |
| 7,345,374 B1 | 3/2008 | Jones et al. | |
| 7,888,584 B2 * | 2/2011 | Lyden | 136/244 |
| 8,129,850 B2 | 3/2012 | Kuelbs et al. | |
| 8,753,168 B2 * | 6/2014 | Kessler | 446/217 |
| 2004/0105256 A1 | 6/2004 | Jones | |
| 2005/0279403 A1 | 12/2005 | Kube | |
| 2009/0297345 A1 | 12/2009 | Crace | |

* cited by examiner

*Primary Examiner* — Peggy Neils
(74) *Attorney, Agent, or Firm* — Jordan IP Law, LLC; Todd A. Vaughn

(57) ABSTRACT

A decorative lawn ornament including a rotatable carrier having a plurality of blades. At least one light-emitting device is arranged on each of the plurality of blades to emit light from the blades. A solar panel is provided to receive and collect sunlight, and a photoswitch is automatically operable between an activated state during instances of insufficient sunlight to thereby activate the light-emitting device, and a deactivated state during instances of sunlight to thereby deactivate the light-emitting device. The decorative lawn ornament is operable such that when a flow of air strikes it, the blades rotate and a decorative member rotates to control an orientation of the blades and the light emitted by the light-emitting devices.

19 Claims, 6 Drawing Sheets

LAWN ORNAMENT HAVING ROTATABLE DECORATIVE BLADES WITH SOLAR-ACTIVATED LIGHT-EMITTING DEVICES

CROSS-REFERENCE TO RELATED APPLICATIONS

The present application claims priority under 35 U.S.C. §119 to Chinese Utility Model Patent Application No. 201320615335.5 (filed on Sep. 30, 2013), which is hereby incorporated by reference in its entirety.

TECHNICAL FIELD

Embodiments relate to a lawn and/or garden ornament having a decorative lawn ornament including a rotatable carrier having a plurality of blades. At least one light-emitting device is arranged on each of the plurality of blades to emit light from the blades. A solar panel is provided to receive and collect sunlight, and a photoswitch is automatically operable between an activated state during instances of insufficient sunlight to thereby activate the light-emitting device, and a deactivated state during instances of sunlight to thereby deactivate the light-emitting device. The decorative lawn ornament is operable such that when a flow of air strikes it, the blades rotate and a decorative member rotates to control an orientation of the blades and the light emitted by the light-emitting devices.

BACKGROUND

Lawn and/or garden ornaments are generally placed in an open lawn and/or garden area of a property.

DESCRIPTION

Figure 1:
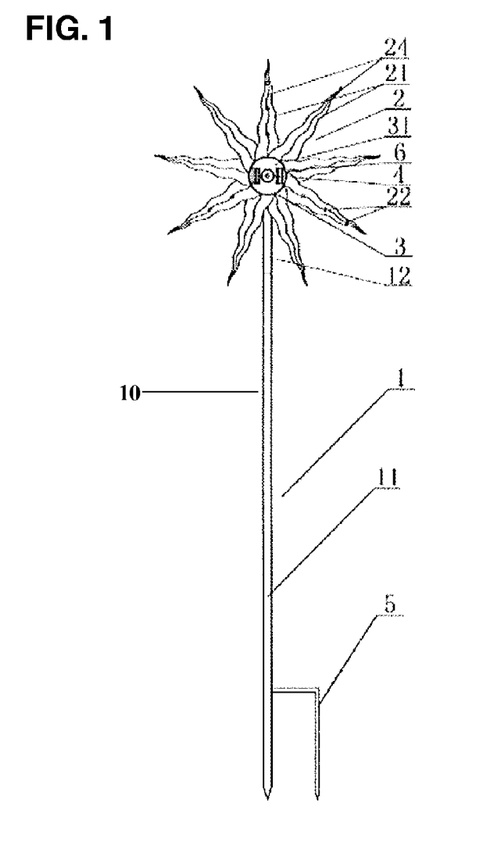
FIG. 1 illustrates a front view of a decorative lawn ornament, in accordance with embodiments.
Figure 2:
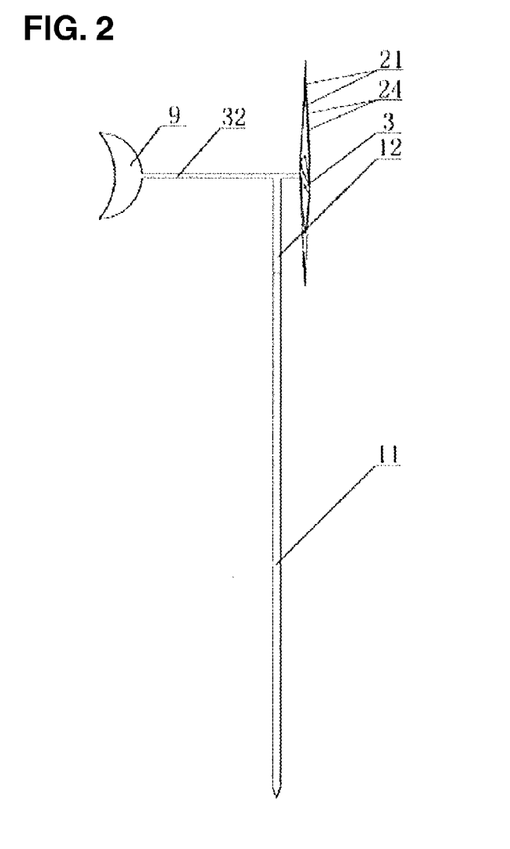
FIG. 2 illustrates a side view of the decorative lawn ornament, in accordance with embodiments.
Figure 3A:
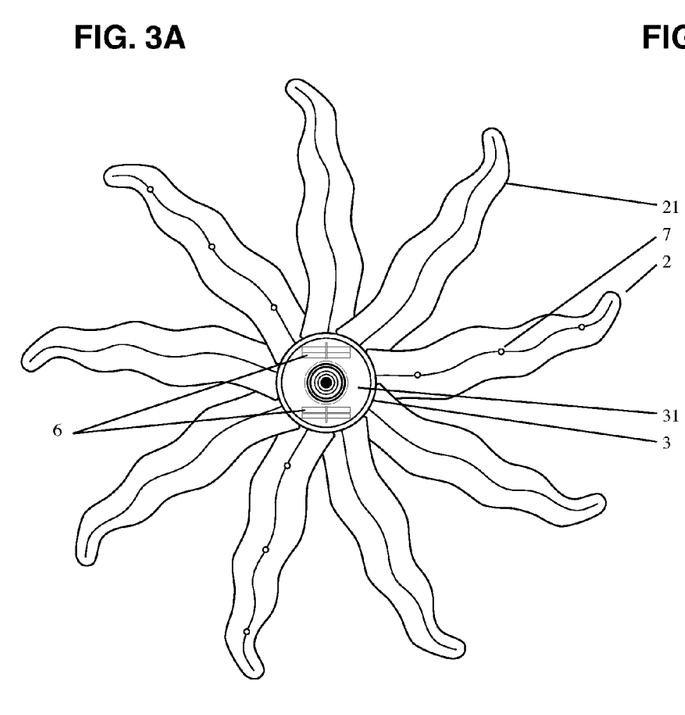
FIGS. 3A to 3D illustrate front, side, rear and partial views of a decorative element, in accordance with embodiments.
Figure 3B:
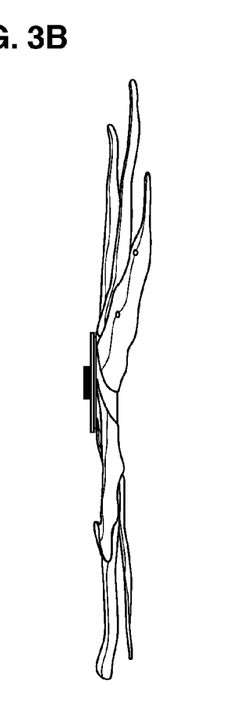
Figures 3C, 3D:
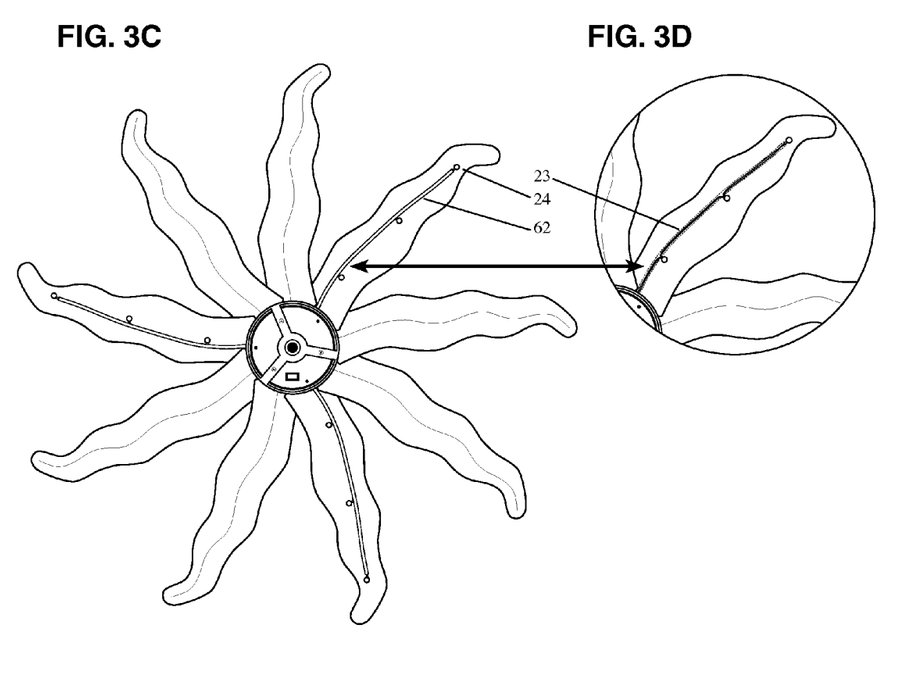
Figure 4A:
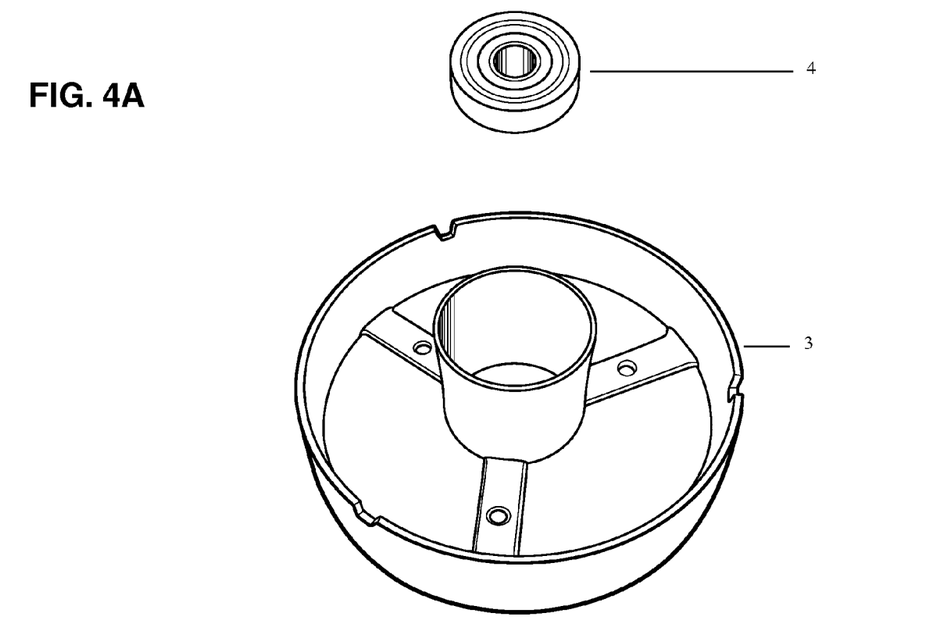
FIGS. 4A and 4B illustrate an exploded view of a carrier and a partial view of a decorative element, in accordance with embodiments.
Figure 4B:
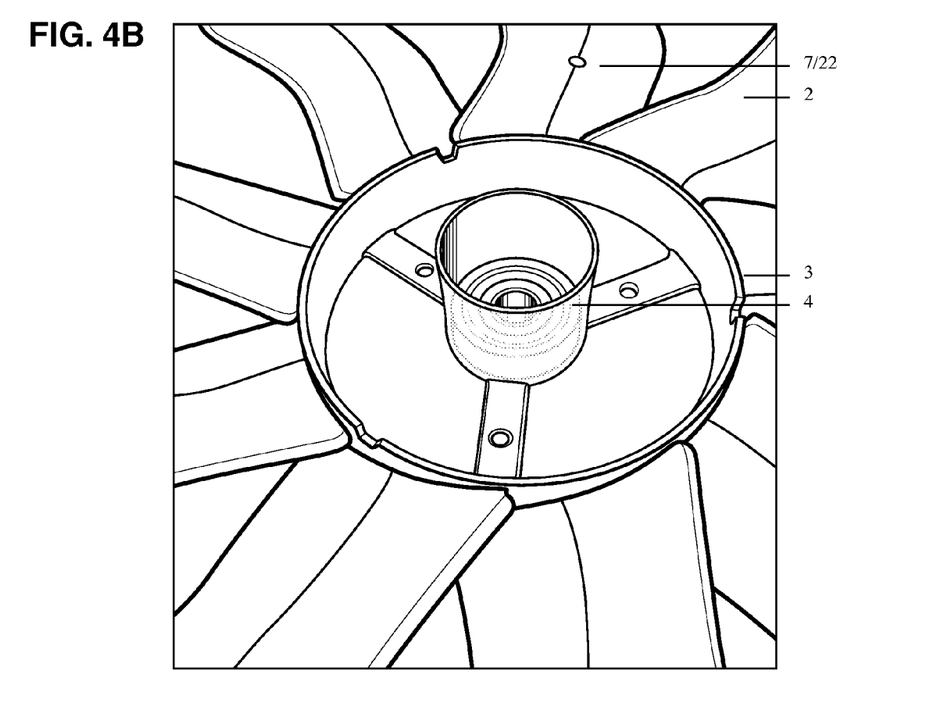

As illustrated in FIGS. 1 and 2, in accordance with embodiments is a decorative lawn ornament 10 for placement in an open area of a lawn, garden or the like. The lawn ornament 10 includes a support member that includes an upper support member 1, a primary or main lower support member 11, and a secondary lower support member 5. The lower support members, namely the main lower support member 11 and the secondary lower support member 5 have distal ends that are insertable into the ground of the lawn, garden or the like, or a support surface placed on and/or over the lawn, garden or the like. The main lower support member 11 is removeably connected at an upper end thereof to the lower end of the upper support member 1. The secondary lower support member 5 has an inverted L cross-section that includes a horizontally-extending member that extends perpendicularly from the main lower support member 11, and a vertically-extending member that extends perpendicularly from the horizontally-extending member (and parallel to the upper and lower support members 1, 5) and which includes the distal end that is insertable into the ground of the lawn, garden or the like.

As illustrated in FIGS. 1 and 2, a decorative member 2 may be rotatably supported on a vertically-extending support sleeve 12. The support sleeve 12 is rotatably connected to the upper support member 1 for rotational movement about the vertical axis defined by the upper and lower support members 1, 11. Extending perpendicularly from the support sleeve 12 is a connecting rod 32 having a directional plate 3 with a crescent-type or hemispherical cross-section extending therefrom. The connecting rod 32 is received by and connected to the carrier tray 3 via a connecting rod 32.

As illustrated in FIGS. 3A to 3D and FIG. 4, the decorative member 2 includes a generally circular carrier tray 3 with a plurality of blades 21 connected thereto, the blades 21 projecting outwardly from the outer circumferential surface of the carrier tray 3. The carrier tray 3 includes a through hole that receives the connecting rod 32 which may be removeably connected to the carrier tray 3. The carrier tray 3 also includes an annular concave cavity 31 sized to removably receive and hold the internal electrical components (i.e., one or more solar panels 6, battery 13 and wiring 23) of the decorative lawn ornament 10. Via an internal bearing 4 in the carrier tray 3, the decorative member 2 rotates about the connecting rod 32 when a flow of wind strikes the surface of the blades 21.

The decorative member 2 further includes light-emitting devices (LEDs) 7 arranged on one or more of the plurality of blades 21 to emit light from the blades 21. The LEDs 7 may comprises light-emitting diodes. The rechargeable battery 13 may be connected to the solar charging/discharging circuit board 8 and the photoswitch 61, with the solar panel(s) 6 being connected to LED(s) 7 and the solar charging/discharging circuit board 8. Alternatively, the rechargeable battery 13 may be electrically connected to at least one solar panel 6, and a solar charging/discharging circuit board 8 is electrically connected to the rechargeable battery 13 and the LEDs 7. Embodiments, however, are not limited to such a configuration and may encompass other configurations that will fall within the spirit and scope of the principles of this disclosure. One or more solar panels 2 may be arranged on the carrier 3 and configured to receive and collect sunlight.

The directional plate 9 has a surface which receives a flow of air which causes the decorative member 2 via the support sleeve 12 to rotate about the vertical axis defined by the upper and lower support members 1, 11. Such a flow of air on the directional plate 3 thereby permits control of the orientation of the blades 21 and the light emitted by the LEDs 7 via rotation of the support sleeve 12, and thus, the decorative member 2, about the upper support member 1. One or more holes 22 extend through a surface of at least one of the blades 21 to receive a corresponding LED 7.

A front surface of each blade 21 may also include a protrusion 24 where a corresponding of the one or more holes 22 and LEDs 7 is arranged. Wiring 23 is provided at a rear surface of a blade 21 having LEDs 7 in order to establish an electrical circuit between the circuit board 8, the rechargeable battery 13, the LEDs 7, the power switch 61 and the solar panel(s) 6. Wiring covers 62 also extend along the rear surface of the blades 21 and which receive corresponding wiring 23. The wiring covers 62 may be embedded in the rear surface of the blades 21.

Figure 5A:
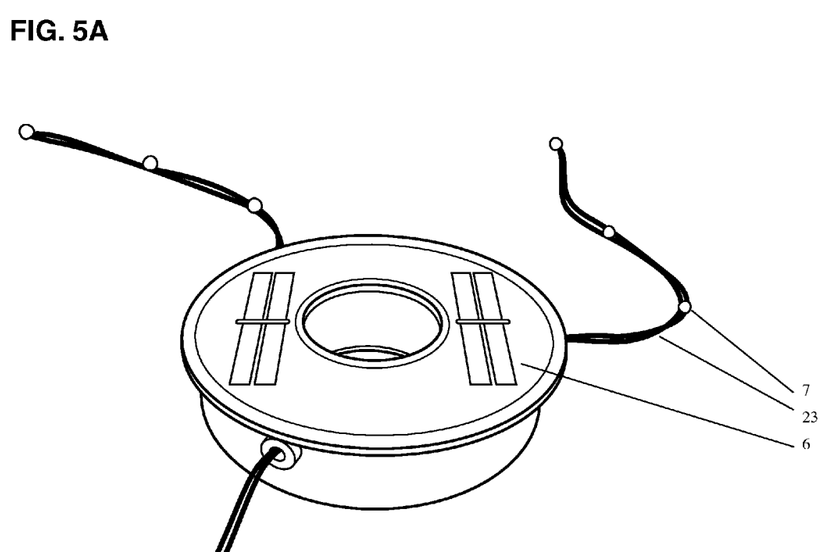
FIGS. 5A, 5B, and 6 respectively illustrate top, bottom and exploded views of a solar panel mounted in a carrier of a decorative element, in accordance with embodiments.
Figure 5B:
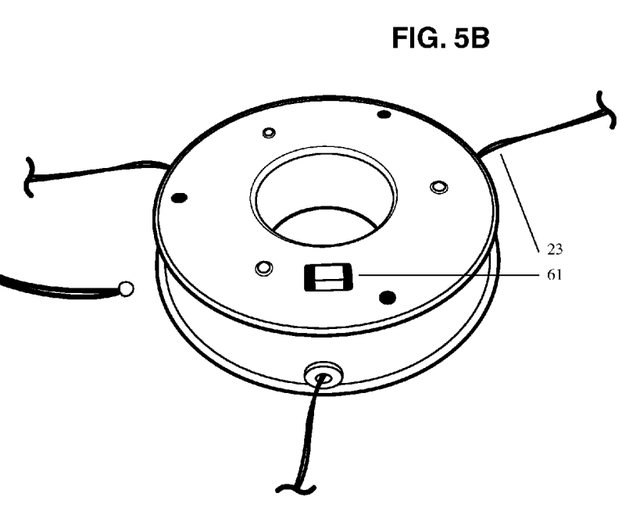
Figure 6:
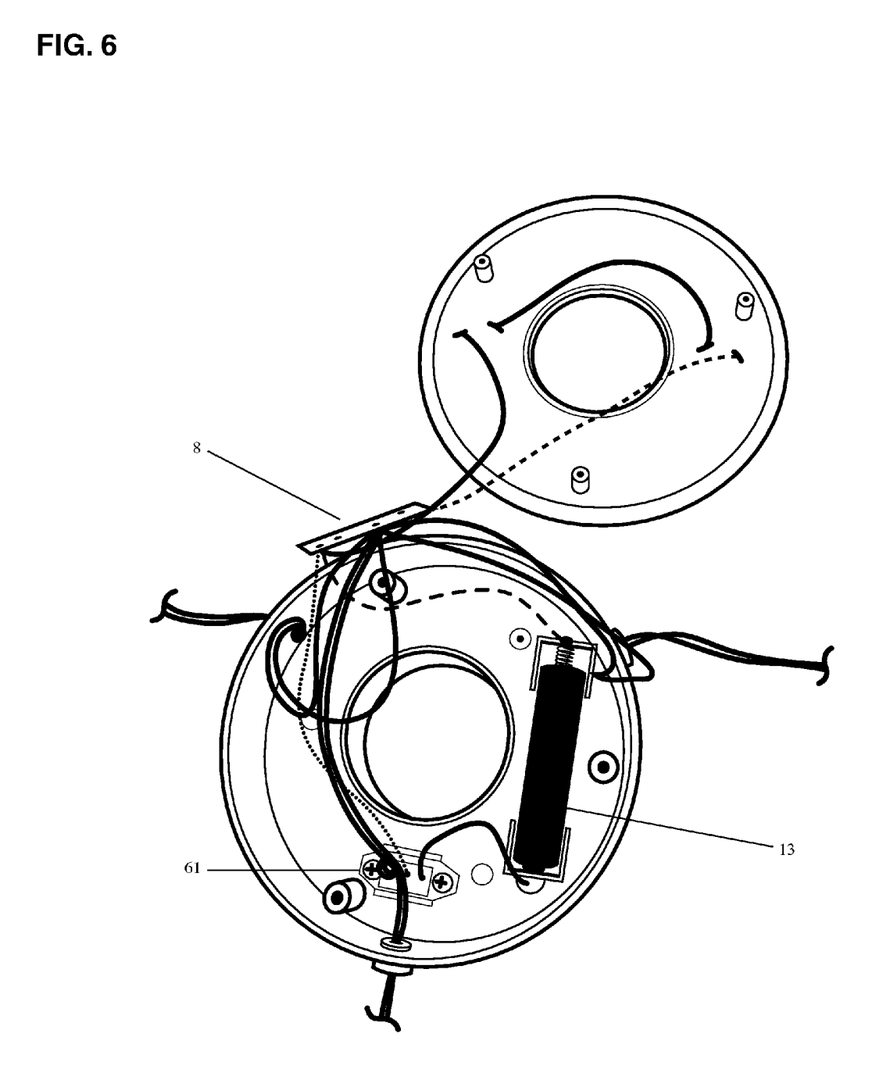

As illustrated in FIGS. 5A 5B and 6, the internal electrical components of the lawn ornament 10 include one or more solar panels 6 to receive and collect sunlight. The rechargeable battery 13 may be electrically connected to the power switch 61 and also the solar charging/discharging circuit board 8. The solar charging/discharging circuit board 8 may also be electrically connected to the solar panel(s) 6. The solar panel(s) 6 may be electrically connected to the light-emitting devices 7. The photoswitch 61 may be automatically operable between an activated state during instances of insufficient sunlight to thereby activate the light-emitting devices 7, and a deactivated state during instances of sunlight to thereby deactivate the light-emitting devices 7.

Accordingly, in operation of the lawn ornament 10, the blades 21 extend from the carrier 3 to initiate rotation of the carrier about the connecting member 32 when a flow of air strikes a surface of the blades 21. Also, the directional plate 9 has a surface which receives a flow of air to permit rotation of the decorative member 2 about the support sleeve 12 to thereby control an orientation of the blades 21 and the light emitted by the LEDs 7.

ADDITIONAL NOTES AND EXAMPLES

Example One may include a decorative lawn ornament comprising a decorative member supported by a support member, the decorative member including a carrier having a plurality of blades extending therefrom, a support sleeve connected to the support member for rotation about an axis defined by the support member, and a connecting member extending perpendicularly from the support sleeve and which has a first end thereof with a directional plate and a second end thereof which supports the carrier for rotation about an axis defined by the connecting member; a photoswitch; a rechargeable battery electrically connected to the photoswitch; a circuit board electrically connected to the rechargeable battery; a solar panel to receive and collect sunlight and which is arranged on the carrier, the solar panel electrically connected to the circuit board; a light-emitting device arranged on at least one of the plurality of blades to emit light from at least one of the blades, wherein the photoswitch is automatically operable between an activated state during instances of insufficient sunlight to thereby activate the light-emitting device, and a deactivated state during instances of sunlight to thereby deactivate the light-emitting device, wherein the plurality of blades extend from the carrier so as to rotate the carrier about the connecting member when a flow of air strikes a surface of the blades, and the directional plate has a surface which receives a flow of air to permit rotation of the decorative member about the support member to thereby control an orientation of the blades and the light emitted by the light-emitting device.

Example Two may include the decorative lawn ornament of Example One, wherein the support member comprises: an upper support member; a lower support member insertable into the lawn; and a secondary lower support member connected to the lower support member and which is insertable in into the lawn.

Example Three may include the decorative lawn ornament of Example One, wherein the connecting member extends perpendicularly from the support sleeve.

Example Four may include the decorative lawn ornament of Example Three, wherein the carrier, the connecting member and the directional plate are coaxially arranged with respect to each other.

Example Five may include the decorative lawn ornament of Example One, wherein the solar panel and the rechargeable battery are respectively received in an annular cavity defined by the carrier.

Example Six may include the decorative lawn ornament of Example One, further comprising a hole extending through a surface of at least one of the blades to receive a corresponding light-emitting device.

Example Seven may include the decorative lawn ornament of Example Six, further comprising a protrusion in the surface of the blades, wherein a corresponding hole is arranged at the protrusion.

Example Eight may include the decorative lawn ornament of Example One, further comprising wiring to establish an electrical circuit between the circuit board, the rechargeable battery, the light-emitting device, the power switch and the solar panel; and wiring covers extending along the rear surface of the blades and which receive corresponding wiring.

Example Nine may include the decorative lawn ornament of Example Eight, wherein the wiring covers are embedded in the rear surface of the blades.

Example Ten may include the decorative lawn ornament of Example One, wherein the light-emitting devices comprises light-emitting diodes.

Example Eleven may include a decorative lawn ornament comprising a support member including an upper support member, a lower support member insertable in into the lawn, and a secondary lower support member connected to the lower support member and which is insertable into the lawn; a decorative member including a carrier having a plurality of blades extending therefrom, a support sleeve connected to the upper support member for rotation about an axis defined by the upper support member, and a connecting member extending perpendicularly from the support sleeve and which has a first end thereof with a directional plate and a second end thereof which supports the carrier for rotation about an axis defined by the connecting member at least one light-emitting device arranged on at least one of the plurality of blades to emit light from the blades; a photoswitch; a rechargeable battery electrically connected to the photoswitch; a circuit board electrically connected to the rechargeable battery; at least one solar panel arranged on the carrier and electrically connected to the circuit board, the at least one solar panel configured to receive and collect sunlight; and at least one light-emitting device arranged on at least one of the plurality of blades to emit light from at least one of the blades, wherein the photoswitch is automatically operable between an activated state during instances of insufficient sunlight to thereby activate the at least one light-emitting device, and a deactivated state during instances of sunlight to thereby deactivate the at least one light-emitting device, wherein the plurality of blades extend from the carrier so as to rotate the carrier about the connecting member when a flow of air strikes a surface of the blades, and the directional plate has a surface which receives a flow of air to permit rotation of the decorative member about the support member to thereby control an orientation of the blades and the light emitted by the light-emitting device.

Example Twelve may include the decorative lawn ornament of Example Eleven, wherein the support member comprises an upper support member; a lower support member insertable into the lawn; and a secondary lower support member connected to the lower support member and which is insertable in into the lawn.

Example Thirteen may include the decorative lawn ornament of Example Eleven, wherein the connecting member extends perpendicularly from the support sleeve.

Example Fourteen may include the decorative lawn ornament of Example Eleven, further comprising at least one hole extending through a surface of at least one of the blades to receive a corresponding one of the at least one light-emitting devices.

Example Fifteen may include the decorative lawn ornament of Example Fourteen, further comprising at least one protrusion in the surface of the blades, wherein a corresponding at least one hole is arranged at the at least one protrusion.

Example Sixteen may include the decorative lawn ornament of Example Eleven, further comprising wiring to establish an electrical circuit between the circuit board, the rechargeable battery, the light-emitting device, the power switch and the solar panel; and wiring covers extending along the rear surface of the blades and which receive corresponding wiring.

Example Seventeen may include the decorative lawn ornament of Example Sixteen, wherein the wiring covers are embedded in the rear surface of the blades.

Example Eighteen may include the decorative lawn ornament of Example Eleven, wherein the light-emitting devices comprise light-emitting diodes.

Example Nineteen may include a decorative lawn ornament comprising a decorative member rotatably supported about a support member, the decorative member including a carrier having a plurality of blades extending therefrom, a support sleeve connected to the support member for rotation about an axis defined by the support member, and a connecting member extending perpendicularly from the support sleeve and which has a first end thereof with a directional plate and a second end thereof which supports the carrier for rotation about an axis defined by the connecting member; a photoswitch; a rechargeable battery electrically connected to the photoswitch; a circuit board electrically connected to the rechargeable battery; at least one solar panel arranged on the carrier and electrically connected to the circuit board, the at least one solar panel configured to receive and collect sunlight; and a plurality of light-emitting devices arranged on at least one of the plurality of blades to emit light from at least one of the blades, wherein the photoswitch is automatically operable between an activated state during instances of insufficient sunlight to thereby activate the light-emitting devices, and a deactivated state during instances of sunlight to thereby deactivate the light-emitting devices, wherein the plurality of blades extend from the carrier so as to rotate the carrier about the connecting member when a flow of air strikes a surface of the blades, and the directional plate has a surface which receives a flow of air to permit rotation of the decorative member about the support member to thereby control an orientation of the blades and the light emitted by the light-emitting devices.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 support member (upper)
2 decorative member
3 carrier tray
4 bearing
5 secondary support member
6 solar panel
7 light-emitting device
8 solar charging/discharging control circuit board
9 directional plate
10 lawn ornament
11 support member (lower)
12 support sleeve
13 battery
21 decorative blades
22 hole
23 wiring
24 protrusion
31 annular concave cavity
32 connecting rod
61 photoswitch
62 wiring covers

What is claimed is:

1. A decorative lawn ornament, comprising:
   a decorative member supported by a support member, the decorative member including a carrier having a plurality of blades extending therefrom, a support sleeve connected to the support member for rotation about an axis defined by the support member, and a connecting member extending perpendicularly from the support sleeve and which has a first end thereof with a directional plate and a second end thereof which supports the carrier for rotation about an axis defined by the connecting member;
   a photoswitch;
   a rechargeable battery electrically connected to the photoswitch;
   a circuit board electrically connected to the rechargeable battery;
   a solar panel to receive and collect sunlight and which is arranged on the carrier, the solar panel electrically connected to the circuit board; and
   a light-emitting device arranged on at least one of the plurality of blades to emit light from at least one of the blades,
   wherein the photoswitch is automatically operable between an activated state during instances of insufficient sunlight to thereby activate the light-emitting device, and a deactivated state during instances of sunlight to thereby deactivate the light-emitting device,
   wherein the plurality of blades extend from the carrier so as to rotate the carrier about the connecting member when a flow of air strikes a surface of the blades, and the directional plate has a surface which receives a flow of air to permit rotation of the decorative member about the support member to thereby control an orientation of the blades and the light emitted by the light-emitting device.

2. The decorative lawn ornament of claim 1, wherein the support member comprises:
   an upper support member;
   a lower support member insertable into the lawn; and
   a secondary lower support member connected to the lower support member and which is insertable in into the lawn.

3. The decorative lawn ornament of claim 1, wherein the connecting member extends perpendicularly from the support sleeve.

4. The decorative lawn ornament of claim 3, wherein the carrier, the connecting member and the directional plate are coaxially arranged with respect to each other.

5. The decorative lawn ornament of claim 1, wherein the solar panel and the rechargeable battery are respectively received in an annular cavity defined by the carrier.

6. The decorative lawn ornament of claim 1, further comprising a hole extending through a surface of at least one of the blades to receive a corresponding light-emitting device.

7. The decorative lawn ornament of claim 6, further comprising a protrusion in the surface of the blades panel, wherein a corresponding hole is arranged at the protrusion.

8. The decorative lawn ornament of claim 1, further comprising:
   wiring to establish an electrical circuit between the circuit board, the rechargeable battery, the light-emitting device, the power switch and the solar panel; and
   wiring covers extending along the rear surface of the blades and which receive corresponding wiring.

9. The decorative lawn ornament of claim 8, wherein the wiring covers are embedded in the rear surface of the blades.

10. The decorative lawn ornament of claim 1, wherein the light-emitting devices comprise light-emitting diodes.

11. A decorative lawn ornament, comprising:
   a support member including an upper support member, a lower support member insertable in into the lawn, and a secondary lower support member connected to the lower support member and which is insertable into the lawn;
   a decorative member including a carrier having a plurality of blades extending therefrom, a support sleeve connected to the upper support member for rotation about an axis defined by the upper support member, and a connecting member extending perpendicularly from the support sleeve and which has a first end thereof with a directional plate and a second end thereof which supports the carrier for rotation about an axis defined by the connecting member;
   a photoswitch;
   a rechargeable battery electrically connected to the photoswitch;
   a circuit board electrically connected to the rechargeable battery;
   at least one solar panel arranged on the carrier and electrically connected to the circuit board, the at least one solar panel configured to receive and collect sunlight; and
   at least one light-emitting device arranged on at least one of the plurality of blades to emit light from at least one of the blades,
   wherein the photoswitch is automatically operable between an activated state during instances of insufficient sunlight to thereby activate the at least one light-emitting device, and a deactivated state during instances of sunlight to thereby deactivate the at least one light-emitting device,
   wherein the plurality of blades extend from the carrier so as to rotate the carrier about the connecting member when a flow of air strikes a surface of the blades, and the directional plate has a surface which receives a flow of air to permit rotation of the decorative member about the support member to thereby control an orientation of the blades and the light emitted by the light-emitting device.

12. The decorative lawn ornament of claim 11, wherein the support member comprises:
   an upper support member;
   a lower support member insertable into the lawn; and
   a secondary lower support member connected to the lower support member and which is insertable in into the lawn.

13. The decorative lawn ornament of claim 11, wherein the connecting member extends perpendicularly from the support sleeve.

14. The decorative lawn ornament of claim 11, further comprising at least one hole extending through a surface of at least one of the blades to receive a corresponding one of the at least one light-emitting device.

15. The decorative lawn ornament of claim 14, further comprising at least one protrusion in the surface of the blades, wherein a corresponding at least one hole is arranged at the at least one protrusion.

16. The decorative lawn ornament of claim 11, further comprising:
   wiring to establish an electrical circuit between the circuit board, the rechargeable battery, the light-emitting device, the power switch and the solar panel; and
   wiring covers extending along the rear surface of the blades and which receive corresponding wiring.

17. The decorative lawn ornament of claim 16, wherein the wiring covers are embedded in the rear surface of the blades.

18. The decorative lawn ornament of claim 11, wherein the light-emitting devices comprise light-emitting diodes.

19. A decorative lawn ornament, comprising:
   a decorative member rotatably supported about a support member, the decorative member including a carrier having a plurality of blades extending therefrom, a support sleeve connected to the support member for rotation about an axis defined by the support member, and a connecting member extending perpendicularly from the support sleeve and which has a first end thereof with a directional plate and a second end thereof which supports the carrier for rotation about an axis defined by the connecting member;
   a photoswitch;
   a rechargeable battery electrically connected to the photoswitch;
   a circuit board electrically connected to the rechargeable battery;
   a solar panel arranged on the carrier and electrically connected to the circuit board, the at least one solar panel configured to receive and collect sunlight; and
   a plurality of light-emitting devices arranged on at least one of the plurality of blades to emit light from at least one of the blades,
   wherein the photoswitch is automatically operable between an activated state during instances of insufficient sunlight to thereby activate the light-emitting devices, and a deactivated state during instances of sunlight to thereby deactivate the light-emitting devices,
   wherein the plurality of blades extend from the carrier so as to rotate the carrier about the connecting member when a flow of air strikes a surface of the blades, and the directional plate has a surface which receives a flow of air to permit rotation of the decorative member about the support member to thereby control an orientation of the blades and the light emitted by the light-emitting devices.

* * * * *